United States Patent [19]

Keyser

[11] Patent Number: 4,829,588

[45] Date of Patent: May 9, 1989

[54] AUTOMATIC RETRANSMISSION WITH PILOT TONE

[75] Inventor: Dean Keyser, Penfield, N.Y.

[73] Assignee: Harris Corporation, Melbourne, Fla.

[21] Appl. No.: 296,236

[22] Filed: Aug. 25, 1981

[51] Int. Cl.[4] .................................... H04B 1/10

[52] U.S. Cl. .................................... 455/21; 455/35; 455/45; 455/228

[58] Field of Search .................... 455/17, 20, 21, 25, 455/57, 9, 268, 58, 68, 70, 45, 228, 31, 35, 36; 370/53, 54, 75, 76; 307/3, 129, 358, 359; 340/825.03, 825.72, 291, 825.48, 825.74; 179/2.51, 170.4, 84 R, 84 T; 329/50, 110, 112

[56] References Cited

U.S. PATENT DOCUMENTS

| | | | |
|---|---|---|---|
| 2,557,581 | 6/1951 | Triman | 340/825.58 X |
| 2,938,081 | 5/1960 | Rouault | 455/228 X |
| 3,219,975 | 11/1965 | Finvold | 340/825.7 |
| 3,458,657 | 7/1969 | Lester et al. | 340/825.58 X |
| 3,654,555 | 4/1972 | Ryan et al. | 455/228 X |
| 3,899,739 | 8/1975 | Herman | 455/35 |
| 4,024,475 | 5/1977 | Brägas et al. | 455/228 |
| 4,228,419 | 10/1980 | Anderson | 455/260 X |
| 4,234,959 | 11/1980 | Andrea, III et al. | 455/35 |
| 4,243,941 | 1/1981 | Zdunek | 329/50 |

FOREIGN PATENT DOCUMENTS 480847 3/1938 United Kingdom .................. 455/43

OTHER PUBLICATIONS

Rudolf F. Graf, *Modern Dictionary of Electronics*, Howard W. Sams & Co., Inc., 1977, pp. 50, 358, 367, 801.
Dauben, Dennis, "Miniature Solid State Tone Encoders to Replace Reeds," CQ, Dec. 1975, pp. 42–45.

*Primary Examiner*—Benedict V. Safourek
*Attorney, Agent, or Firm*—Rogers & Killeen

[57] ABSTRACT

A transceiver and method of controlling the automatic retransmission of a radio frequency commmunications signal in which a pilot tone within the radio frequency communications channel bandwidth but above the band of frequencies necessary for intelligence is phase modulated at a frequency below the frequency band of the intelligence and combined with the intelligence for transmission over a first frequency communication link. When received, the presence of the pilot tone and the modulation is detected, compared with predetermined standards and utilized to control the application of the demodulated intelligence to a second communication link. After establishing the second communication link, the predetermined standards utilized to control the application of the intelligence to the second communication link are relaxed.

7 Claims, 2 Drawing Sheets

RECEIVER MODE

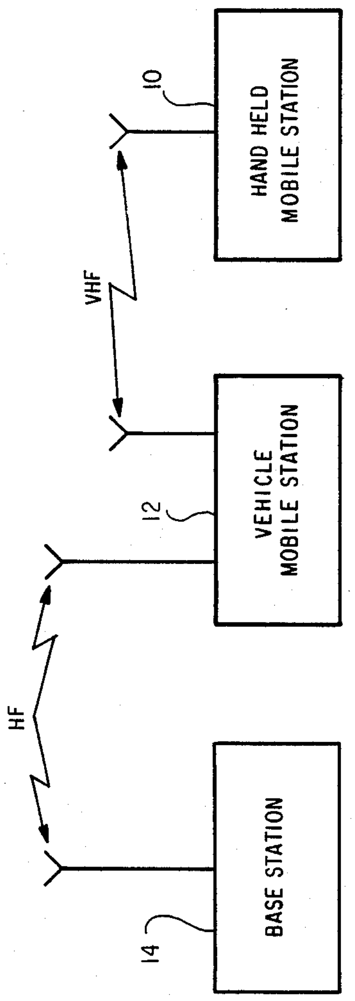
FIG. 1 SYSTEM
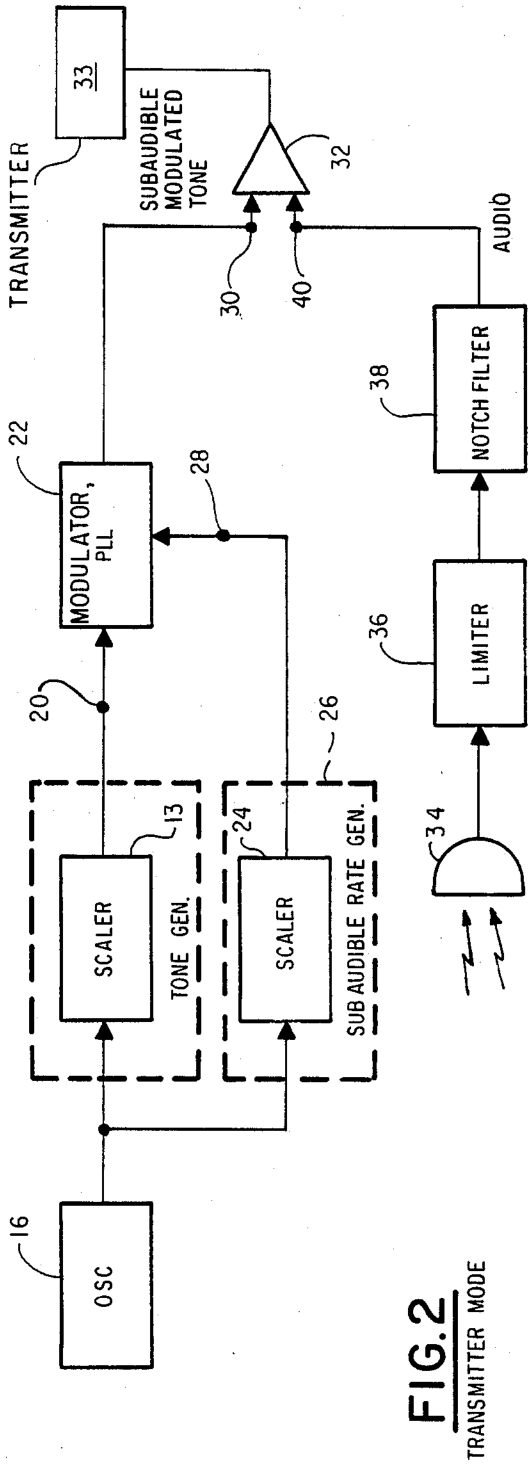
FIG. 2 TRANSMITTER MODE

RECEIVER MODE

FREQUENCY SPECTRUM

AUTOMATIC RETRANSMISSION WITH PILOT TONE

BACKGROUND OF THE INVENTION

The present invention relates to an automatic retransmission system transceiver and method which provides the benefit of a muted receiver on both channels. A normal configuration for such systems is a HF radio communication link for medium and long range transmission connected through the retransmission unit to a short range UHF or VHF communication channel. Retransmission of the signal occurs when reception of a properly coded signal is detected by the retransmission unit.

A prior art system such as illustrated by the Moore U.S. Pat. No. 3,702,440 dated Nov. 7, 1972 provides a modulated calling signal for transmission along with an information signal, the amplitude modulated, single frequency or tone, calling signal being utilized to enable a selected receiver for reproducing the received information signal. In systems such as that described by Moore, the calling signal is continuous, the frequency of the calling signal is in the lower part of the audio frequency range, and the frequency of the square wave modulation signal is no greater than about twenty-five percent of the frequency of the tone in the calling signal. There is no amplitude ajustment of the calling signal as a function of the amplitude of the information signal nor is there any time delay to provide a tolerance for incorrect modulating signal detection.

Other prior art systems such as that disclosed in the Cannalte et al U.S. Pat. No. 3,546,574 dated Dec. 8, 1970 utilize signal bursts of a predetermined frequency and duration as the calling signal.

Still other systems such as that disclosed in the Groeneveld et al U.S. Pat. No. 3,084,328 transmit a pilot tone signal having a frequency greater than the audio frequency band. The pilot tone is amplitude modulated by a function of the information channel content.

Yet another system has been by the assignee hereof which detects both the presence and modulation of a pilot tone at a frequency within the channel bandwidth but above the intellegence. In such systems, it has been found that the standards for comparing the detected subaudible rate in the presence of interference often prevent retransmissions.

It is an object of the present invention to provide a nvoel transceiver and method of retransmission of intelligence over communication links of different frequencies.

It is another object of the present invention to provide a novel system and method which prevents the detection of modulating signal harmonics and which eliminates dead zones in the detection band.

It is another object of the present invention to provide a novel transceiver and method in which the control or calling signal is a tone which is modulated in phase at a subaudible rate to prevent the detection of harmonics of the desired subaudible rate in the received information signal as well as to eliminate dead zones within the detection band.

It is yet another object of the present invention to provide a novel transceiver and method in which the standards for the subaudible rate evaluation are varied to provide proper operation although the modulation be disturbed after the second communication link is established.

These and other objects and advantages of the present invention will be apparent from the claims and from the following detailed description when read in conjunction with the appended drawings.

THE DRAWINGS

FIG. 1 is a functional block diagram illustrating the retransmission system of the present invention;

FIG. 2 is a functional block diagram of the transceiver of the present invention operative in the "transmit" mode;

DETAILED DESCRIPTION

Figure 3:
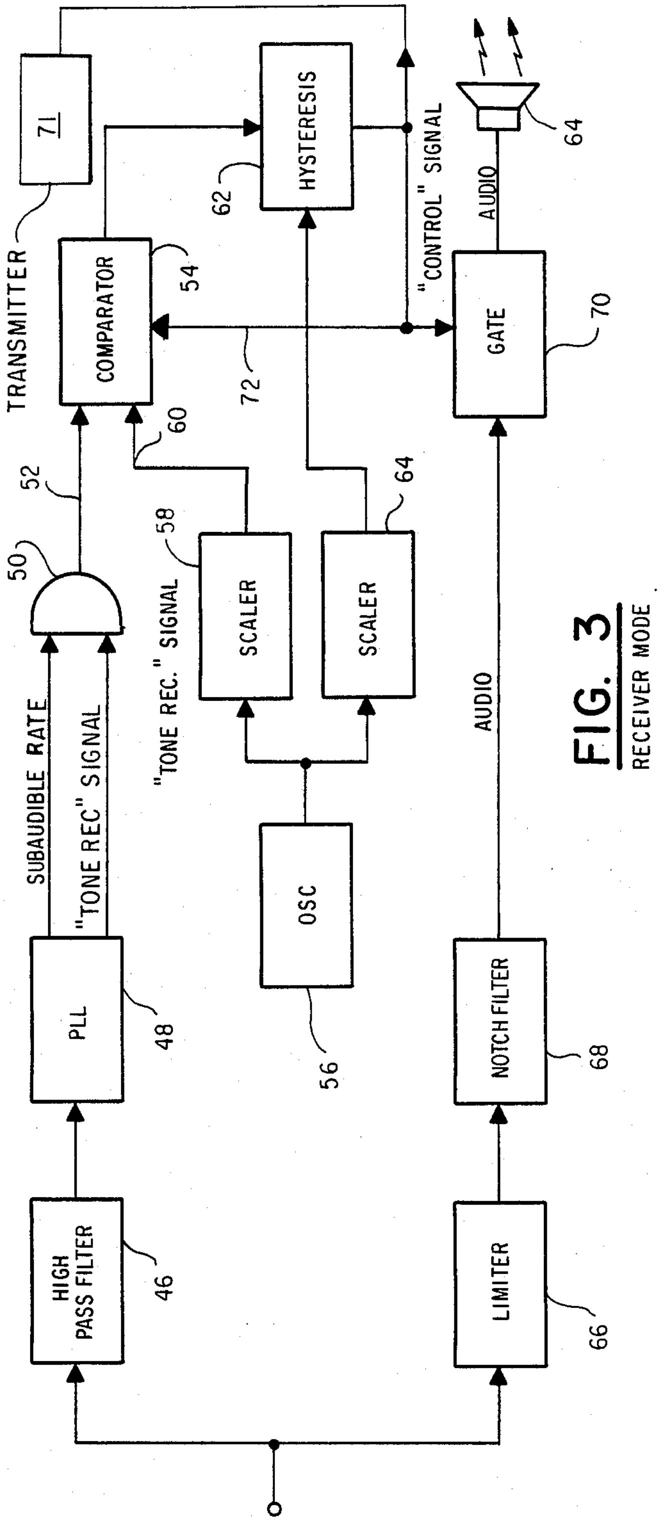
FIG. 3 is a functional block diagram of the transreceiver of the present invention operating in the "receive" mode.

The system of the present invention may be used for the automatic retransmission of voice and/or data signals between two simplex or half duplex ratio channels. The normal configuration is illustrated in FIG. 1 wherein the signal from a hand-held mobile station 10 may be transmitted by a line-of-sight VHF or UHF communication link to a vehicle mobile station 12 for retransmission. The vehicle mobile station 12, upon receipt of the VHF or UHF signal, and upon detection of a proper code, effects retransmission of the voice or data signal to a base station 14 via a medium or long rate communication system such as the high frequency communication signal illustrated.

The reverse signal path is also provided by the present invention wherein a medium or long range communication channel is used for the transmission of voice or data signals from the base station 14 to a remote vehicle mobile station 12 for automatic retransmission to a hand held mobile station 10 over a short range communication system.

With reference to FIG. 2 wherein the transceiver of the present invention illustrated in the "transmit" mode, a suitable conventional crystal controlled oscillator 16 may be used to generate a signal which is passed through a scaler 18 in a tone generator to produce a pilot tone. The pilot tone is applied to an input terminal 20 of a phase modulator 22, such as a phase lockloop.

Similarly, the output signal from the oscillator 16 may be passed through a scaler 24 within a subaudible rate generator 26 for application to an input terminal 28 of the phase modulator 22. The output from the phase modulator may be applied to one input terminal 30 of a conventional summing amplifier 32.

Likewise, and by way of illustration only, a voice signal may be detected by a microphone 34 or received in any conventional manner, such as being received from a receiver section of a transceiver, and applied through a limiter 36 and notch filter 38 to the second input terminal 40 of the summing amplifier 32. The output signal from the amplifier 32 may then be used to modulate the carrier frequency of the radio frequency communication link in a conventional transmitter 33.

In operation and with continued reference to FIG. 2, the signal from the oscillator 16 is converted by the scaler 18 into a pilot tone within the channel bandwidth but above the audio frequency band. Similarly, the output from the oscillator 16 is converter by the scaler 24 into a subaudible frequency which is used to phase modulate the pilot tone. Thus, the phase modulator 22 produces a single frequency tone which is phase modulated at a subaudible rate for application to the summing amplifier 32.

The audio signal from the microphone 34 is processed in a suitable conventional manner applied through a notch filter 38 to the summing amplifier 32. A function of the limiter 36 and notch filter 38 is to control the relative amplitudes of the audio and tone signals and to provide a frequency band within which the tone may be modulated at the subaudible rate without interference.

Figure 4:
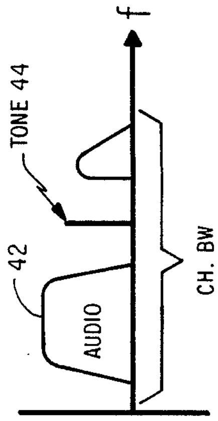
FIG. 4 is an illustration of the frequency spectrum of the signals transmitted.

The relationship between the audio signal and the tone may be seen from reference to the frequency spectrum diagram illustrated in FIG. 4 wherein the frequencies within the channel bandwidth are illustrated. As shown in FIG. 4, the audio frequencies are within the frequency spectrum illustrated in the numeral 42 with the pilot tone illustrated by the narrow line 44 movable in frequency at a subaudible rate within the gap created by the notch filter 38 of FIG. 2.

When the transmitted signal is received by one of the automatic retransmission units of the present invention, the transceiver is adapted to operate in the "receive" mode as illustrated in FIG. 3.

With reference to FIG. 3, the input signal is immediately split into two signal paths. In one of these signal paths, the input signal is applied through a high pass filter 46 to remove the audio frequency components from the signal and the resultant signal applied to the receive phase lock loop 48. The receive phase lock loop 48 acquires the subaudible rate of the phase modulation and provides a "tone received" signal indicating the presence of the pilot tone. When both the pilot tone and the modulation rate are detected the demodulated subaudible rate signal is passed through the 'AND' gate 50 and applied to one input terminal 52 of a comparator 54.

With continued reference to FIG. 3, an oscillator 56 which may be of the crystal control type provides an input signal to a scaler 58 which in turn provides the second input signal at the other input terminal 60 of the comparator 54. The output signal from the comparator 54 is applied to the squelch hysteresis circuit 62.

The oscillator 56 output signal is also applied through a suitable conventional scaler 64 to the hysteresis circuit 62. The output signal from the hysteresis circuit 62 is applied to a transmitter 71 to control the automatic retransmission of the audio signal and/or is used as a "control" signal to control the application of the audio signal to a speaker 64. Alternatively, the output signal may be applied to the transmitter 71 to control the automatic retransmission of the input signal.

In the second signal channel, the input signal may be applied through suitable conventional limiter circuit 66 and a notch filter 68 to the input terminal of a gate circuit 70 which is controlled by the "control" signal from the hysteresis circuit 62 in its application to the speaker 64 and/or the transmitter 71.

In operation and with continued reference to FIG. 3, the high pass filter 46 serves to separate the pilot tone from the audio signal. Once the tone is acquired by the phase lock loop 48 and the subaudible phase modulation rate detected, the subaudible rate is compared with a reference signal from the oscillator 56 by way of the scaler 58. The output signal of the oscillator 56 is also applied to the scaler 64 and then to the hysteresis circuit to thereby provided the "on" and "off" thresholds which control the operation of the squelch hysteresic circuit 62.

Similarly, the limiter 66 and the notch filter 68 are used to eliminate the pilot tone from the input signal and to apply the audio signal to the speaker 64 and/or the transmitter 71 under the control of the hysteresis squelch circuit 62.

If the subaudible rate as applied to the comparator 54 does not match a predetermined standard, the hysteresis circuit 62 prevents generation of the "control" signal and thus inhibits both automatic retransmission and the speaker 64.

Where the modulated pilot tone is disturbed by excessive voice or data signal amplitude, signal fading, or other interference sufficiently to effect the accuracy of the demodulation by the phase locked loop 48, the comparator 54 will not cause the hysteresis circuit 62 to provide the "control" signal to effect retransmission of the "audio" signal.

To provide acceptable performance under such conditions, the hysteresis circuit 62, once its threshold has been exceeded, also applies the "control" signal to the comparator 54 to relax the accuracy requirements. Any suitable conventional logic circuit may be utilized for this purpose.

As will be apparent from the above functional descriptions, the received circuits and transmits circuits of the transceiver of the present invention may be completely separate units. On the other hand, many of the components may be shared by the two circuits under suitable and conventional control logic.

By the novel method of the present invention, reliable control of automatic retransmission over high frequency voice channel is satisfactorily achieved. The use of the comparator, i.e. the digital period measuring circuit, to compare the recovered subaudible rate with the desired rate, the system rejects harmonically related subaudible rates and eliminates dead zones within valid detection bands.

The notch filter removes the pilot tone and sidebands when operating in the "receive" mode and removes speech components from that part of the spectrum to be occupied by the modulated pilot tone when operating in the "transmit" mode.

The detection bandwidth in the frequency of the free running phase lock loop used to detect the pilot tone and recover the subaudible rate will accommodate error in channel frequency and stability consistent with such communications, i.e. 50–100 hertz.

In addition, the variable standards of the comparator keep the transceiver operational in the presence of interference.

Derivation of the tone and modulation signals from a crystal reference is desirable as is the setting of the pilot tone amplitude approximately 10 dB. below the peak power capability of the transmitter during periods of no audio content. In the presence of audio, the ratio of speed to tone will not normally exceed 7 dB.

In a particular example, the notch filter is approximately 200 hertz wide with sidebands at 40 dB. rejection. The audio frequency is considered to be between about 300 hertz and about 2000 hertz and the high pass filter is desirably set to remove frequencies below about 2500 hertz.

What is claimed is:

1. A method of controlling the automatic retransmission of a radio frequency communication signal comprising the steps of:

(a) providing a pilot tone at a frequency within the radio frequency communication channel bandwidth but above the band of frequencies necessary for intelligence;

(b) phase modulating the pilot tone at a frequency below the intelligence;

(c) transmitting the radio frequency signal including the intelligence and the phase modulated pilot tone;

(d) receiving the radio frequency signal;

(e) detecting the presence of the pilot tone and the frequency of modulation thereof;

(f) comparing the detected frequency of modulation with a predetermined frequency standard with a predetermined accuracy standard;

(g) retransmitting the radio frequency signal responsively to the comparison; and (h) modifying the accuracy standard of the frequency comparison responsively to the comparison.

2. A method of controlling the automatic retransmission of a high frequency radio communication signal comprising the steps of:

(a) providing a pilot tone at a frequency within the high frequency radio communication channel bandwidth but above the audio band of frequencies;

(b) phase modulating the pilot tone at a subaudible rate by means of a phase locked loop;

(c) providing an audio signal;

(d) summing the modulated pilot tone and the audio signal to form a modulation signal;

(e) transmitting a high frequency signal modulated by the modulation signal;

(f) receiving the high frequency signal;

(g) demodulating the high frequency signal to recover the modulation signal;

(h) removing the pilot tone and its modulation components from the recovered modulation signal by means of a notch filter;

(i) detecting the presence of the pilot tone and the subaudible rate by means of a phase locked loop;

(j) comparing to a predetermined accuracy standard the subaudible rate with a locally generated rate standard to provide a control signal;

(k) retransmitting the high frequency radio communication signal responsively to the control signal; and (l) relaxing the predetermined accuracy standard or the rate comparison responsively to the control signal.

3. In a method of obtaining a desired degree of selectivity in an audio frequency communication system by recognition of information signals at two discrete frequencies wherein the signal having the higher frequency is modulated by the signal having the lower frequency so that the lower frequency is accurately recoverable despite variations in the high frequency within the tolerance of audio frequency communication systems, the improvement wherein the accuracy of recognition of the lower frequency is reduced once the lower frequency is detected.

4. In a radio frequency communication system having a predetermined channel bandwidth including a spectrum of bandwidth necessary for voice communication, a method of detecting a relatively low frequency signal comprising the steps of:

(a) providing a relatively high frequency signal within the channel bandwidth, the relatively high frequency signal being above the spectrum of bandwidth in the channel necessary for voice communication;

(b) phase modulating the relatively high frequency signal by a relatively low frequency signal below the spectrum of bandwidth in the channel necessary for voice communication;

(c) providing a voice communication signal;

(d) filtering the voice communication signal to clear space for the phase modulated relatively high frequency signal;

(e) superimposing the phase modulated relatively high frequency signal on the voice communication signal;

(f) transmitting the superimposed signals;

(g) receiving the superimposed signals;

(h) removing the voice communication signal from the superimposing signal by a high pass filter;

(i) demodulating the phase modulated relatively high frequency signal to recover the relatively low frequency signal to an accuracy variable as a function of prior recovery of the relatively low frequency signal; and (j) removing the relatively high frequency signal from the voice communication signal by a notch filter.

5. The method of claim 4 wherein the initial degree of accuracy is about three percent;

wherein the voice communication signal is between about 300 Hz and about 2000 Hz;

wherein the relatively low frequency signal is between about 30 Hz and about 70 Hz;

wherein the voice communication signal is filtered to remove frequencies below about 2000 Hz; and wherein the notch filter is approximately 200 Hz wide with sidebands at 40 db rejection.

6. An automatic retransmission radio frequency communication system comprising:

means for generating a pilot tone at a frequency within the radio frequency communication channel bandwidth but above the band of frequencies necessary for intelligence;

means for phase modulating said pilot tone at a frequency below the intelligence;

means for transmitting a radio frequency signal including the intelligence and the phase modulated pilot tone;

means remote from said transmitting means for receiving the transmitted radio frequency signal;

means for detecting the presence of the pilot tone and the frequency of modulation thereof;

means having a first accuracy requirement for comparing the detected frequency of modulation with a predetermined standard until a predetermined condition is met and thereafter having a second accuracy requirement less than said first accuracy requirement; and means responsive to said comparison means for retransmitting the radio frequency signal.

7. An automatic retransmission high frequency radio communication system comprising:

means for providing a pilot tone at a frequency within the high frequency radio communication channel bandwidth but above the audio band of frequencies;

means for phase modulating said pilot tone at a subaudible rate by means of a phase locked loop;

means for providing an audio signal;

means for superimposing said modulated pilot tone of said audio signal to form a modulation signal;

means for transmitting a high frequency signal modulated by said modulation signal;

means for receiving said high frequency signal;

means for demodulating said high frequency signal to recover the modulation signal;

notch filter means for removing said pilot tone and its modulation components from said modulation signal;

phase locked loop means for detecting the presence of said pilot tone and said subaudible rate;

means for comparing said subaudible rate with a locally generated rate standard to provide a control signal;

means responsive to said control signal for retransmitting said high frequency radio communication signal; and means responsive to said control signal for modifying the accuracy requirements of said comparing means.

* * * * *